(12) United States Patent
Huff

(10) Patent No.: US 7,787,387 B2
(45) Date of Patent: *Aug. 31, 2010

(54) AUTO-SELECTION OF SGMII OR SERDES PASS-THROUGH MODES

(75) Inventor: Gary S Huff, Laguna Hills, CA (US)

(73) Assignee: Broadcom Corporation, Irvine, CA (US)

( * ) Notice: Subject to any disclaimer, the term of this patent is extended or adjusted under 35 U.S.C. 154(b) by 2303 days.

This patent is subject to a terminal disclaimer.

(21) Appl. No.: 10/230,158

(22) Filed: Aug. 29, 2002

(65) Prior Publication Data

US 2003/0179709 A1  Sep. 25, 2003

Related U.S. Application Data

(60) Provisional application No. 60/398,587, filed on Jul. 26, 2002, provisional application No. 60/365,806, filed on Mar. 21, 2002.

(51) Int. Cl.
  H04J 1/16 (2006.01)
  H04J 3/14 (2006.01)
  H04L 1/20 (2006.01)
(52) U.S. Cl. .................................... 370/248
(58) Field of Classification Search ................ 370/241, 370/242, 244, 245, 248–252, 419, 420, 463; 709/223, 224
  See application file for complete search history.

(56) References Cited

U.S. PATENT DOCUMENTS 4,862,452 A  8/1989 Milton et al.

(Continued)

FOREIGN PATENT DOCUMENTS

EP  0 573 204 A2  12/1993

(Continued)

OTHER PUBLICATIONS

U.S. Appl. No. 10/230,160, filed Aug. 29, 2002, Huff.

(Continued)

*Primary Examiner*—Pankaj Kumar
*Assistant Examiner*—Duc T Duong
(74) *Attorney, Agent, or Firm*—Sterne, Kessler, Goldstein & Fox PLLC

(57) ABSTRACT

Methods and systems for operating a physical layer device ("PHY") in an Ethernet network include methods and systems for detecting active link partners and for selecting a mode of operation based on detected active link partners, without user intervention. The PHY monitors fiber link media and copper link media for active link partners. The PHY selects a mode of operation according to detected active link partners. For example, a serial gigabit media independent ("SGMII") mode of operation is selected when an active copper link partner is detected and an active fiber link partner is not detected. Similarly, a serialize/deserialize ("SerDes") pass-through mode of operation is selected when an active fiber link partner is detected and an active copper link partner is not detected. The PHY interfaces with the active copper link partner when the SGMII mode of operation is selected. Conversely, the PHY interfaces with the active fiber link partner when the SerDes pass-through mode of operation is selected. The SGMII or SerDes pass-through mode of operation can be prioritized for when active copper and fiber link partners are detected. The prioritized mode can be user selectable or factory set. The invention optionally powers down circuitry associated with an unselected mode of operation.

50 Claims, 5 Drawing Sheets

U.S. PATENT DOCUMENTS

| | | | |
|---|---|---|---|
| 5,095,308 | A | 3/1992 | Hewitt |
| 5,541,929 | A | 7/1996 | Jokura |
| 5,577,023 | A | 11/1996 | Marum et al. |
| 5,768,301 | A | 6/1998 | Dreyer et al. |
| 5,774,814 | A | 6/1998 | Haas |
| 5,790,946 | A | 8/1998 | Rotzoll |
| 5,907,553 | A | 5/1999 | Kelly et al. |
| 6,026,494 | A | 2/2000 | Foster |
| 6,065,073 | A * | 5/2000 | Booth .................. 710/46 |
| 6,215,764 | B1 | 4/2001 | Wey et al. |
| 6,393,050 | B1 | 5/2002 | Liu |
| 6,418,558 | B1 | 7/2002 | Roberts et al. |
| 6,442,142 | B1 | 8/2002 | Bar-Niv |
| 6,459,393 | B1 | 10/2002 | Nordman |
| 6,487,214 | B1 | 11/2002 | Bachar |
| 6,516,352 | B1 * | 2/2003 | Booth et al. ............. 709/250 |
| 6,678,728 | B1 | 1/2004 | Uppunda et al. |
| 6,691,233 | B1 | 2/2004 | Gannage et al. |
| 6,697,368 | B2 | 2/2004 | Chang et al. |
| 6,718,139 | B1 * | 4/2004 | Finan et al. ............. 398/59 |
| 6,735,244 | B1 | 5/2004 | Hasegawa et al. |
| 6,812,803 | B2 * | 11/2004 | Goergen ................ 333/1 |
| 6,819,760 | B1 | 11/2004 | Nayler |
| 6,868,088 | B2 * | 3/2005 | Gibson et al. ............. 370/419 |
| 6,894,602 | B2 | 5/2005 | Browning |
| 6,912,485 | B2 | 6/2005 | Lightfoot et al. |
| 6,999,543 | B1 | 2/2006 | Trinh et al. |
| 7,020,728 | B1 | 3/2006 | Jones et al. |
| 7,024,489 | B2 | 4/2006 | Aviles |
| 7,027,459 | B2 | 4/2006 | Fukui et al. |
| 7,054,309 | B1 * | 5/2006 | Hoot et al. .............. 370/360 |
| 7,058,833 | B1 | 6/2006 | Bremer et al. |
| 7,079,528 | B2 | 7/2006 | Ziegler et al. |
| 7,119,701 | B2 | 10/2006 | Browning |
| 7,127,624 | B2 | 10/2006 | Berman et al. |
| 7,149,397 | B2 | 12/2006 | Popovic et al. |
| 7,203,174 | B2 | 4/2007 | Huff |
| 7,227,875 | B2 | 6/2007 | Deng |
| 7,257,169 | B2 | 8/2007 | Shahar et al. |
| 7,283,481 | B2 * | 10/2007 | Huff .................. 370/248 |
| 7,324,507 | B1 * | 1/2008 | Lo et al. ............. 370/360 |
| 7,362,797 | B2 | 4/2008 | Chan et al. |
| 7,486,721 | B2 | 2/2009 | Chan et al. |
| 7,706,433 | B2 | 4/2010 | Chan et al. |
| 2001/0033583 | A1 | 5/2001 | Rabenko et al. |
| 2002/0019954 | A1 | 2/2002 | Tran |
| 2002/0023234 | A1 | 2/2002 | Berman et al. |
| 2002/0061012 | A1 | 5/2002 | Thi et al. |
| 2002/0089972 | A1 | 7/2002 | Chang et al. |
| 2003/0112798 | A1 | 6/2003 | Ziegler et al. |
| 2003/0149922 | A1 | 8/2003 | Lai |
| 2003/0179710 | A1 | 9/2003 | Huff |
| 2003/0179711 | A1 | 9/2003 | Huff |
| 2003/0179771 | A1 | 9/2003 | Chan et al. |
| 2003/0179816 | A1 | 9/2003 | Huff et al. |
| 2003/0223469 | A1 | 12/2003 | Deng |
| 2004/0017815 | A1 | 1/2004 | Huff |
| 2005/0111531 | A1 | 5/2005 | Booth et al. |
| 2005/0196119 | A1 | 9/2005 | Popovic et al. |
| 2007/0022310 | A1 | 1/2007 | Berman et al. |
| 2008/0069004 | A1 | 3/2008 | Huff |

FOREIGN PATENT DOCUMENTS

| | | |
|---|---|---|
| EP | 0 856 975 A2 | 8/1998 |
| EP | 0 856 975 A3 | 8/1998 |
| EP | 0 963 080 A2 | 12/1999 |
| EP | 1 480 391 A3 | 9/2007 |
| WO | WO 00/59176 | 10/2000 |
| WO | WO 01/47159 A1 | 6/2001 |
| WO | WO 03/081785 A1 | 10/2003 |

OTHER PUBLICATIONS

U.S. Appl. No. 10/230,159, filed Aug. 29, 2002, Huff.
U.S. Appl. No. 10/231,066, filed Aug. 30, 2002, Huff et al.
Final/Partial European Search Report for Appln. No. EP 03 00 6504, mailed Sep. 29, 2003, 2 pages.
U.S. Appl. No. 10/347,295, filed Jan. 21, 2003, Huff.
Search Report for European App. No. EP 03006503, dated Sep. 29, 2003, 3 pgs.
Search Report for PCT Application No. PCT/US03/08684, filed Mar. 21, 2003, 7 pgs.
10 Gigabit Ethernet Technology Overview White Paper, Revision 1.0, 10GEA: 10 Gigabit Ethernet Alliance, pp. 1-21 (May 2001).
Design Considerations for Next Generation LAN and SAN Gigabit Ethernet Switches, Cicada Semiconductor and SwitchCore Corp., pp. 1-13 (Jun. 2001).
Search Report for European App. No. EP 03006505, dated Sep. 29, 2003, 3 pgs.
XP000502465: "Power Management Method for Portable Personal Computer with Modem", vol. 38, No. 2, Feb. 1995.
www.wikipedia.com->CPLD.
BCM5411 10/100/1000 Base-T Transceiver Product Brief, Broadcom Corporation, 2 pages, Copyright 2001.
Search Report for European App. No. EP 03006502.3, dated Aug. 12, 2003, 3 pgs.
Final/Partial Search Report for European App. No. EP 03006504, dated Sep. 29, 2003, 2 pgs.
Search Report for European App. No. EP 1 480 391 A3, dated Aug. 2, 2007, 2 pgs.
Chan et al., "Physical Layer Device Having an Analog Serdes Pass Through Mode", U.S. Appl. No. 11/892,290, filed Aug. 21, 2007.
Non-Final Office Action for U.S. Appl. No. 10/230,160, mailed Nov. 14, 2006, 13 pgs.
Notice of Allowance for U.S. Appl. No. 10/230,160, mailed Jun. 22, 2007, 6 pgs.
Non-Final Office Action for U.S. Appl. No. 11/902,470, mailed Mar. 31, 2010, 11 pgs.
Non-Final Office Action for U.S. Appl. No. 11/902,470, mailed Sep. 9, 2009, 7 pgs.

* cited by examiner

AUTO-SELECTION OF SGMII OR SERDES PASS-THROUGH MODES

CROSS-REFERENCE TO RELATED APPLICATIONS

This patent application claims priority to U.S. provisional application No. 60/398,587, titled, "Auto Selection of SGMII or SerDes Pass-Through Modes of Operation," filed Jul. 26, 2002, and to U.S. provisional application No. 60/365,806, titled, "Gigabit Ethernet Transceiver," filed Mar. 21, 2002, both of which are incorporated herein by reference in their entirety.

BACKGROUND OF THE INVENTION

1. Field of the Invention

The present invention is directed to Ethernet communication systems and, more particularly, to Ethernet physical layer devices.

2. Related Art

Ethernet is a widely used technology in local area networks ("LAN") and other computer networks. The Institute for Electrical and Electronics Engineers ("IEEE") has developed standards for Ethernet communication systems. See, for example, IEEE 802.3, incorporated herein by reference in its entirety. The IEEE 802.3 standards have been adopted by the International Organization for Standardization ("ISO"), making the IEEE 802.3 standards worldwide standards.

In an Ethernet network, a computer utilizes an Ethernet transceiver to transmit and receive signals between the computer and a network. The transceiver typically interfaces with the network via a physical link medium, such as copper or fiber.

An Ethernet transceiver typically includes a media access controller ("MAC") that interfaces with applications running on the computer. Alternatively, an Ethernet module can include a switch or an optical module. An Ethernet transceiver also includes a physical layer device, or "PHY" that interfaces between the MAC/switch and a physical link media. PHYs typically interface with physical link media using serialized data streams. PHYs typically interface with MACs/switches using packet-based interfaces.

PHYs can be designed to interface with any of a variety of types of physical link medium (e.g., copper or fiber). PHYs can also be designed to interface with MAC/switches through any of a variety of interface format.

What is needed is a PHY that can selectively interface with MAC/switches in any of a plurality of modes, and that can selectively interface with any of a plurality of types of physical link media, depending upon the availability of active link partners.

BRIEF SUMMARY OF THE INVENTION

The present invention is directed to methods and systems for operating a physical layer device ("PHY") in an Ethernet network. More particularly, the present invention is directed to methods and systems for detecting active link partners and for selecting a mode of operation corresponding to detected active link partners, without user intervention.

In accordance with the invention, a PHY has copper and fiber ports for coupling to copper and fiber link media. An electrical/optical converter typically interfaces the fiber port with the fiber link media. The PHY further includes a fiber signal detect node for coupling to a fiber signal detect output port of the electrical/optical converter. The fiber signal detect node receives a fiber signal detect indication from the electrical/optical converter. The PHY is thus able to monitor the fiber link media for an active fiber link partner.

The PHY further includes copper link detect circuitry that allows the PHY to monitor a copper link media for an active copper link partner. The PHY is thus able to monitor/detect both the fiber link media and the copper link media for active link partners.

In accordance with the invention, the PHY selects a mode of operation corresponding to detected active link partners. For example, a serial gigabit media independent ("SGMII") mode of operation is selected when an active copper link partner is detected and an active fiber link partner is not detected. Similarly, a serialize/deserialize ("SerDes") pass-through mode of operation is selected when an active fiber link partner is detected and an active copper link partner is not detected.

The PHY then interfaces with the active copper or fiber link partner in the selected mode of operation. For example, the PHY interfaces with the active copper link partner when the SGMII mode of operation is selected. Similarly, the PHY interfaces with the active fiber link partner when the SerDes pass-through mode of operation is selected.

The invention optionally provides a prioritized mode of operation for when active copper and fiber link partners are detected. The prioritized mode can be user-selectable or factory set. The invention optionally powers down circuitry associated with an unselected mode of operation.

The invention optionally provides a prioritized mode of operation for when no active copper or fiber link partners are detected. The prioritized mode can be user-selectable or factory set.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE FIGURES

The present invention will be described with reference to the accompanying drawings. The drawing in which an element first appears is typically indicated by the leftmost digit(s) in the corresponding reference number.

DETAILED DESCRIPTION OF THE INVENTION

Table of Contents

Figure 1:
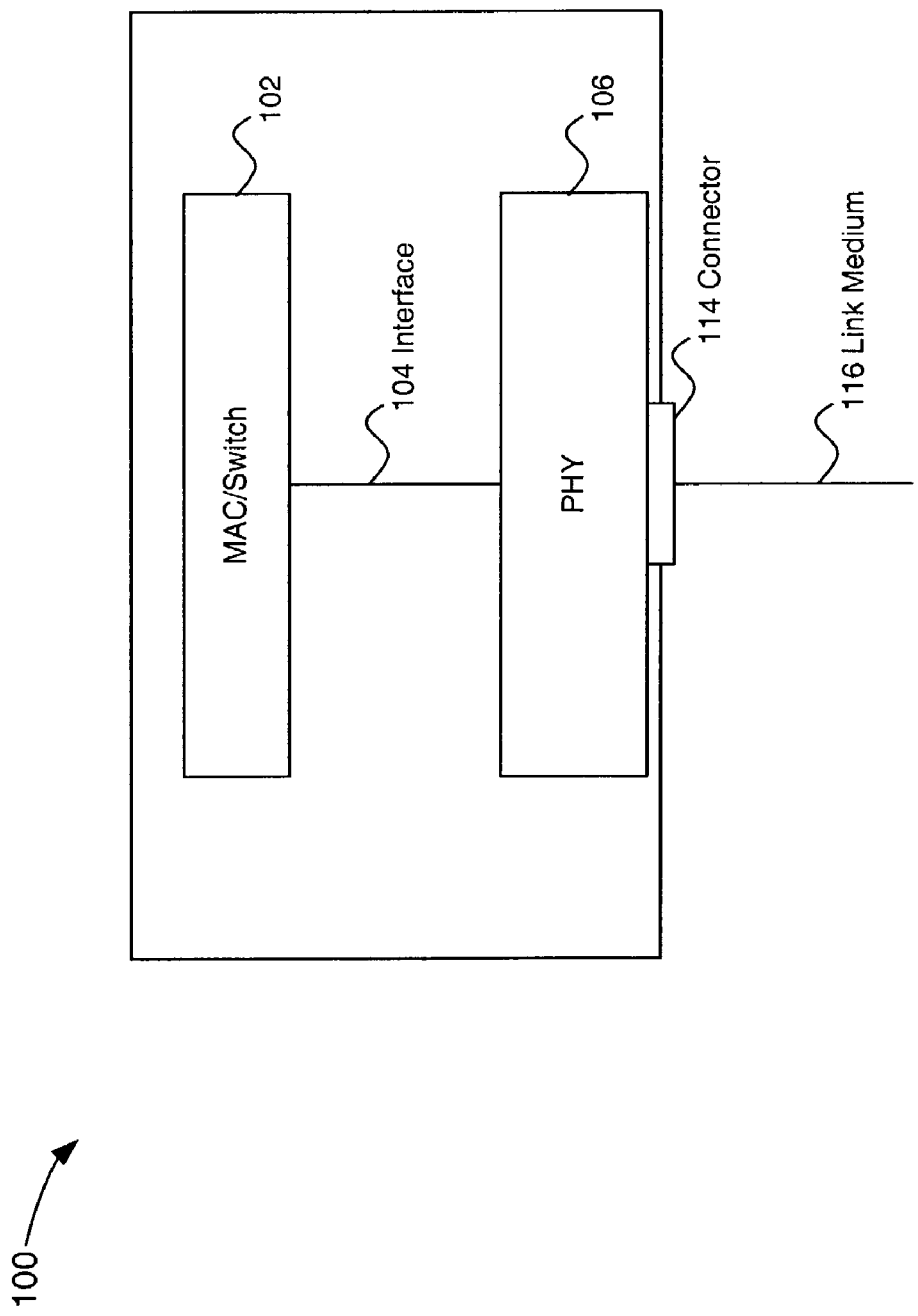
FIG. 1 is a high-level block diagram of an Ethernet transceiver 100.

I. Introduction
II. Detecting Active Copper and Fiber Link Partners
III. SGMII Mode
IV. SerDes Pass-Through Mode
V. Mode Selection
VI. Powering Down Unselected Media
VII. Methods for Detecting Active Link Partners, for Selecting a Mode of Operation, and for Powering Down Unselected Media
VIII. Integration in a Multi-Mode PHY
IX. Conclusion

I. INTRODUCTION

The present invention is directed to an Ethernet transceiver physical layer device ("PHY") that serially interfaces with a link device, such as a MAC, switch, optical device, or the like ("MAC/switch"), and that selectively interfaces with a copper or a fiber physical link media depending upon the presence of active link partners coupled to a remote end of the physical link media.

Methods and systems for simultaneously monitoring for active link partners on copper and fiber link mediums are taught in, for example, co-pending U.S. application Ser. No. 10/230,160, titled, "Auto Detection of Copper and Fiber Mode," filed on Aug. 29, 2002, and incorporated herein by reference in its entirety. This involves a PHY attached to a MAC/switch through a Gigabit Media Independent Interface "(GMII"). The GMII interface involves approximately 22 pins.

In accordance with the invention, in order to reduce pin count, a PHY interfaces with a MAC/switch through a serializer/deserializer ("SerDes") interface. In an example implementation, the SerDes interface includes a 1.25 Gbaud data signal with a 625 MHz clock. The PHY includes a DDR interface, which is described below. Each signal is generated as a differential signal pair to provide signal integrity and to minimize noise. The invention is not, however, limited to this example.

In accordance with the invention, the three speeds operated by the GMII interface (i.e., 10, 100, and 100 megabits per second), are supported for backward compatability. The SerDes interface selectively operates in either serial GMII ("SGMII") mode or 1000-X mode. The present invention monitors a copper link media and a fiber link media for active link partners, and selects a link media according to logic described below. When the copper link media is selected, the PHY interfaces with a MAC/Switch in SGMII mode. When the fiber link media is selected, the PHY interfaces with the MAC/Switch in 1000-X mode. In the latter scenario, the PHY, or a portion thereof, is powered down and the PHY interfaces between the MAC/switch and the fiber link media using a new SerDes pass-through transceiver. The SerDes pass-through transceiver is taught in co-pending U.S. application Ser. No. 10/347,295, titled, "A Physical Layer Device Having a SerDes Pass-Through Mode," filed Jan. 1, 2003, and incorporated herein by reference in its entirety.

In order for the MAC/switch to interface with the PHY in the selected mode (i.e., SGMII or 1000-X), the PITY PHY notifies the MAC/switch of the selected mode.

The invention is further directed to a PHY that includes SGMII capability and a new serialize/deserialize ("SerDes") pass-through mode. The SerDes pass-through mode is described in co-pending U.S. application Ser. No. 10/347, 295, titled, "A Physical Layer Device Having a SerDes Pass-Through Mode," filed Jan. 1, 2003, and incorporated herein by reference in its entirety. The PHY selectively operates in an SGMII or SerDes pass-through mode, depending upon whether active fiber and/or copper link partners are detected.

Logic for selecting between copper link media and fiber link media is now described. When an active copper link partner is detected and an active fiber link partner is not detected, the PHY selects the copper link and interfaces with the MAC/switch in SGMII mode. Conversely, when an active fiber link partner is detected and an active copper link partner is not detected, the PHY selects the fiber link partner and interfaces with the MAC/switch in the 1000-X mode.

The invention allows the fiber or copper link medium to be prioritized so that when both the fiber link partner and the copper link partner are active, the PHY will select the prioritized physical link medium. Circuitry associated with the non-prioritized physical link medium and/or an unselected mode of operation, is optionally powered down to conserve power.

FIG. 1 is a block diagram of an Ethernet transceiver, or module 100, wherein a MAC/switch 102 interfaces with a PHY 106 via a serial interface 104. The serial interface 104 can be a SGMII or a 1000-X serial interface. The PHY 106 is coupled to a physical link media 116 by a connector 114. As described below, the physical link media 116 includes a copper link media and a fiber link media.

Figure 2:
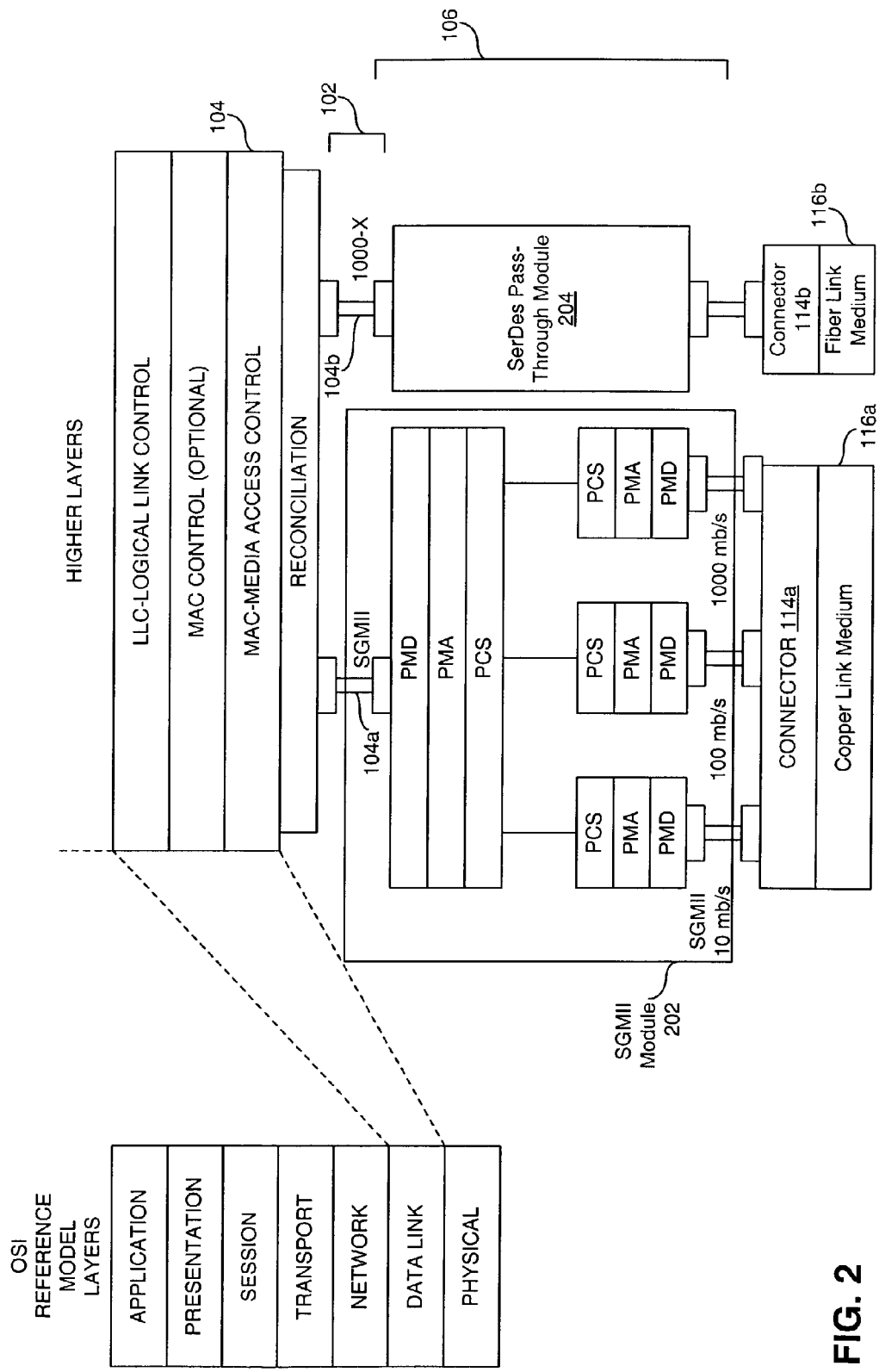
FIG. 2 is a detailed block diagram of an example embodiment of the Ethernet transceiver 100.

On the MAC/Switch 102 side, the PHY 106 receives serial transmit signals from the MAC/switch 102. The PHY 106 deserializes the transmit signals to recover encoded parallel data. The parallel data is processed within the PHY 106 to recover the transmitted data. The decoded transmitted data is then sent out on the physical link media 116. On the physical link media 116 side, the PHY 106 receives data from the physical link media link 116, serializes it, and sends it to the MAC/switch 102. FIG. 2 is a detailed block diagram of an example embodiment of the Ethernet module 100, wherein the MAC 102 interfaces with the PHY 106 via a SGMII or 1000-X interface 104.

In FIG. 2, the PHY 106 includes an SGMII module 202 and a SerDes pass-through module 204. The SGMII module 202 includes physical coding sub-layers ("PCSs"), physical medium attachment sub-layers ("PMAs"), and physical medium dependent sub-layers ("PMs"), all of which are well known to those skilled in the relevant art(s). The PCSs provide services including encoding/decoding of data for communication with the PMAs. The PMAs provide a medium independent platform for the PCSs to support the use of a range of serial-bit-oriented physical media links. The PMDs implement signaling in accordance with, for example, IEEE and/or ANSI standards.

PMDs associated with the copper link can include signal processing circuitry such as, for example, and without limitation, echo cancellation, cross-talk cancellation, equalization, timing and/or phase recovery, gain control, and baseline wander correction. Such signal processing can be used, for example, to improve signal-to-noise ratios ("SNR") and "eye" openings of signals sent to and/or received from the copper link media 116a.

The Ethernet module 100 further includes a copper connector 114a, such as an RJ45 connector, that connects the PHY 106 to a copper link medium 116a. The Ethernet module 100 also includes a fiber connector 114b that connects the PHY 106 to a fiber link media 116b. The fiber connector 114b typically includes an optical-to-electrical converter.

The example Ethernet module 100 illustrated in FIGS. 1 and 2 are provided for illustrative purposes. The present invention is not limited to these examples. Based on the description herein, one skilled in the relevant art(s) will understand that the invention can be implemented in other types of Ethernet modules as well.

II. DETECTING ACTIVE COPPER AND FIBER LINK PARTNERS

Figure 3:
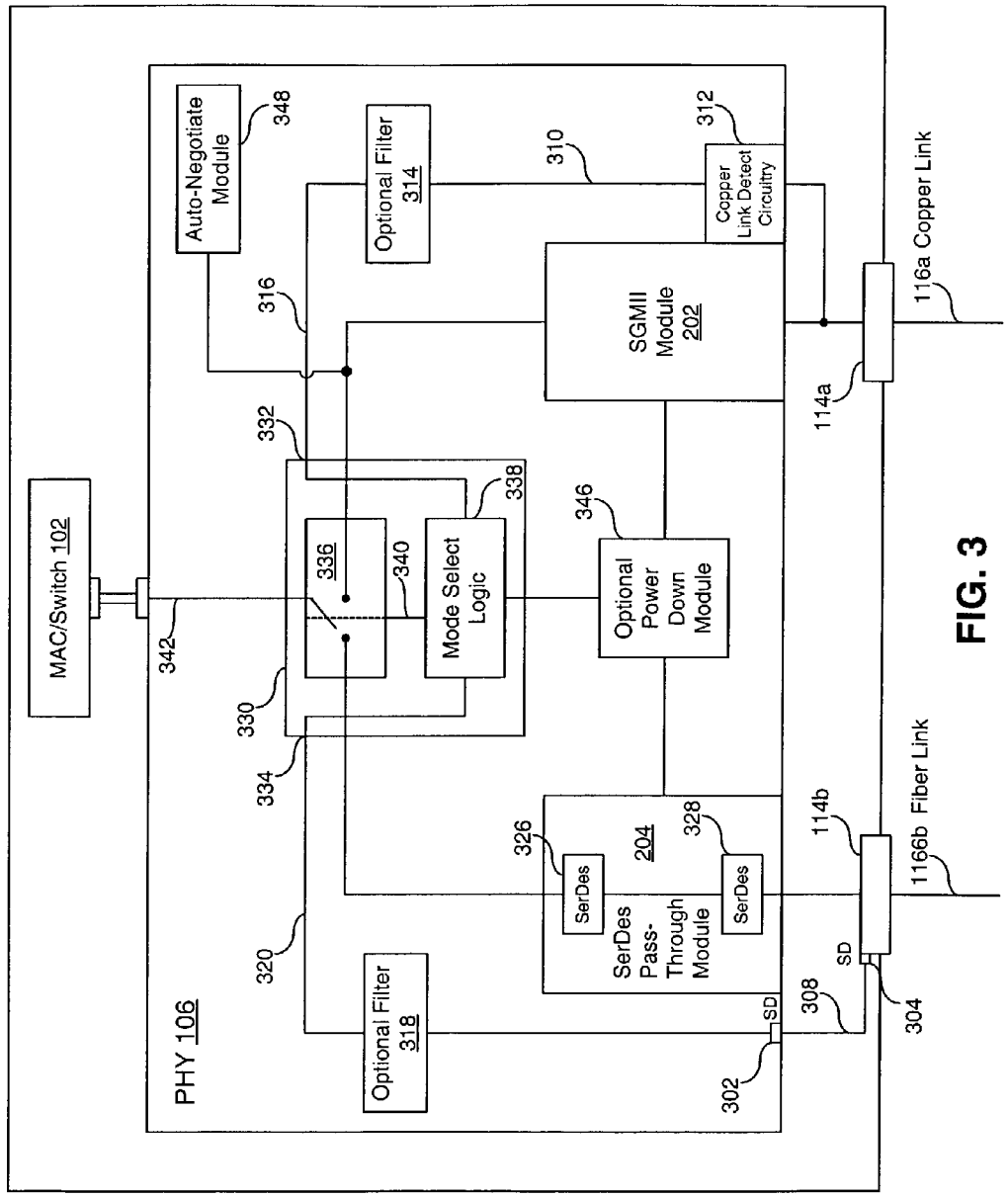
FIG. 3 is a block diagram of the Ethernet module 100, including copper link detect circuitry 312 and a fiber signal detect ("SD") node 302, in accordance with the invention.

Methods and systems for detecting active link partners are now described. The resulting information can be used to select between SGMII and SerDes Pass-Through modes of operation, for powering down unselected media, and/or for other purposes. FIG. 3 is a block diagram of the Ethernet module 100, wherein the PHY 106 includes, among other elements, copper link detect circuitry 312 and a fiber signal detect ("SD") node 302.

The fiber SD node 302 is now described. Recall from above that the fiber connector 114b typically includes an optical/electrical converter. Conventional optical-to-electrical converters include a fiber SD output port, illustrated here as fiber SD output port 304. The fiber SD output port 304 is active when an intensity of an optical signal on the fiber link media 116b is above a threshold. The fiber SD output port 304 is coupled to the fiber SD node 302. When the intensity of the optical signal on the fiber link media 116b is above the threshold, an active fiber SD signal 308 is provided from the fiber SD output port 304 to the fiber SD node 302. The PHY 106, thus, detects active fiber link partners.

The copper link detect circuitry 312 is now described. The copper link detect circuitry 312 includes circuitry that detects whether a copper link partner is active on the copper physical link media 116a. In the example of FIG. 3, the copper link detect circuitry 312 is coupled to a node between the SGMII module 202 and the copper connector 114a. Alternatively, the copper link detect circuitry 312 is coupled to the copper connector 114a, the copper link 116a, and/or to the SGMII module 202.

The copper link detect circuitry 312 detects whether a copper link partner is active on the copper physical link media 116a. When an active link partner is detected by the copper link detect circuit 312, the copper link detect circuit 312 outputs a copper link detect signal 310. The copper link detect circuitry 312 can be implemented, for example, as disclosed in one or more of the following U.S. applications:

Ser. No. 09/928,622, titled, "Energy Detect with Auto Pair Select," filed Aug. 13, 2001;

Ser. No. 09/886,859, titled, "Regulating Transceiver Power Consumption for a Transceiver in a Communications Network," filed Jun. 21, 2001; and/or Ser. No. 10/231,066, titled, "Auto Powerdown for Forced Speed Modes," filed Aug. 30, 2002.

All of which are incorporated herein by reference in their entireties. The invention is not, however, limited to the embodiments disclosed therein.

The PHY 106 illustrated in FIG. 3 thus detects whether there is an active link partner coupled to the fiber connector 114b and/or to the copper connector 114a, without user and/or software intervention. After active link partners are detected, the Ethernet module 100 can utilize the detection information for one or more of a variety of purposes, including, without limitation, selecting an appropriate mode of operation and/or powering down circuitry associated with an unselected mode, both of which are described below.

The PHY 106 optionally includes a copper link detect signal filter 314 and/or a fiber SD signal filter 318. The copper link detect signal filter 314 includes circuitry for filtering and/or debouncing the copper link detect signal 310. The copper link detect signal filter 314 outputs a filtered copper link detect signal 316. The fiber SD signal filter 318 includes circuitry for filtering and/or debouncing the fiber SD signal 308. The fiber SD signal filter 318 outputs a filtered fiber SD signal 320.

III. SGMII MODE

An example implementation of the SGMII module 202 is now described. The SGMII module 202 uses 2 data signals and 1 clock signal to convey frame data and link rate information between the PHY 106 and the MAC/switch 102. The data signals operate at 1.25 Gigabaud, and the clocks operate at 625 MHz, double data rate ("DDR"). DDR utilizes both rising and falling edges of the clock signal. The signals are preferably implemented as differential pairs to improve signal integrity and to minimize system noise.

When the MAC/switch 102 operates below 1000 speed (e.g., 10 Mbps or 100 Mbps), the PHY 106 and/or the MAC/switch 102, elongates a frame by replicating each frame byte 10 times for 100 Mbps and 100 times for 10 Mbps. This frame elongation typically takes place above the PCS, in accordance with IEEE 802.3z, so that a start frame delimiter appears only once per frame.

At the receive side, the PHY 106 passes the signals from the copper link 116a through the PCS. The PHY 106 serializes the PCS data to create an SGOUT± pin signal pair, and sends it to the MAC/switch 102 at 1.25 Gbps data rate along with the 625 MHz DDR SCLK± pin signal pair.

At the transmit side, the PHY 106 de-serializes data received from the MAC/switch 102 at the SGIN± pin to recover encoded parallel data. The PHY 106 passes parallel data through a receive state machine within the PCS to recover the transmit signals. The decoded transmit signals are passed through a transmit block and are output to the copper link 116a with predetermined speed.

When the PHY 106 detects a link change from the copper link partner, the PHY 106 starts a PHY/MAC auto-negotiation process, using a PHY/MAC auto-negotiation module 348 (FIG. 3), and sends updated control information to the MAC/switch 102. The SGMII module 202 uses the PHY/MAC auto-negotiation module 348 to pass control information to the MAC/switch 102, to notify the MAC/switch 102 of the change in link status. The MAC/switch 102 receives and decodes control information and starts the auto-negotiation process.

IV. SerDes PASS-THROUGH MODE

The SerDes pass-through Module 204 is now described. When the PHY 106 serially interfaces with the MAC/switch 102, the PHY 106 typically performs a number of processes on the data, such as de-serializing, de-packetizing, and decoding processes. Another PHY at a remote end of the physical link reverses the processes (e.g., packetizing, encoding, and re-searializing the data). This is necessary for copper physical link media because the data needs to be reformatted for transmission over copper wires. A fiber cable, however, can accommodate 1000-X data without decoding/de-packetizing the data from the MAC/switch. Thus, for fiber link media, at least some of the processes performed by the PHYs are unnecessary. Variations between clock rates in the MAC/switch 102 and a remote fiber link partner, however, prevent a direct connection between the MAC/switch 102 and the remote fiber link partner.

Accordingly, the new SerDes pass-through mode has been developed, as taught in the co-pending U.S. application Ser. No. 10/347,295, titled, "A Physical Layer Device Having a SerDes Pass-Through Mode," filed Jan. 1, 2003, and incorporated above by reference in its entirety. In the example of FIG. 3, the SerDes pass through mode is implemented within the SerDes pass-through module 324. When selected, the SerDes pass-through module 324 interfaces with the MAC/switch 102 through a 1000-X interface.

The SerDes pass-through module 324 includes a first serializer/de-serializer ("SerDes") 326 and a second SerDes 328. Data transmitted from the MAC/switch 102 to the PHY 106 is de-serialized by the first SerDes 326 and then re-serialized by the second SerDes 328 for transmission over the fiber link 116b. Similarly, data received from the fiber link 116b is de-serialized by the second SerDes 328 and re-serialized by the first SerDes 326. The first and second SerDes 326 and 326 operate with a unique clocking scheme that compensates for variations between clock rates in the MAC/switch 102 and a remote fiber link partner. The clocking scheme is taught in the co-pending U.S. application Ser. No. 10/347,295, titled, "A Physical Layer Device Having a SerDes Pass-Through Mode," filed Jan. 1, 2003, and incorporated above by reference in its entirety.

In accordance with the present invention, the PHY 106 selectively interfaces with the MAC/switch 102 in SGMII mode using the SGMII module 202 and an SGMII interface 104a, or in the SerDes pass-through mode using the SerDes pass-through module 324 and a 1000-X interface 104b, depending upon whether an active copper and/or fiber link partner is detected.

For example, when a fiber link partner is detected, the MAC/switch 102 communicates with the fiber link partner through the 1000-X interface 104b. Conversely, when an active copper link partner is detected, the PHY 106 auto-negotiates with the MAC/switch 102 to operate in the SGMII mode.

The invention optionally provides for prioritization of fiber or copper media links when both fiber and copper active link partners are detected, as described below.

V. MODE SELECTION

The detection of one or more active link partners can be used to select a mode of operation without user intervention. Selection of the SGMII mode or the SerDes pass-through mode is now described.

Selection of the SGMII mode or the SerDes pass-through mode is controlled by the mode selector 330. The mode selector 330 includes a copper link detect node 332 and a fiber signal detect ("SD") node 334. The copper link detect node 332 is coupled to the copper link detect signal filter 314 to receive the filtered copper link detect signal 316. When an active copper link partner is detected by the copper link detect circuitry 312, the copper link detect signal filter 314 outputs the filtered copper link detect signal 316 to the copper link detect node 332.

The fiber SD node 334 is coupled to the fiber SD signal filter 318. When an intensity of an optical signal on the fiber link media 116b is above a threshold, the filtered active fiber SD signal 320 is provided to the mode selector 330 through the fiber SD node 334.

The mode selector 330 is functionally illustrated with a switch module 336 controlled by mode selector logic 338. The mode selector logic 338 outputs a mode select signal 340 to the switch module 336. The mode select signal 340 controls the switch module 336 to route data 342 between the MAC/switch 102 and the SGMII module 202 or the SerDes pass-through module 204.

The data 342 includes transmit and receive data. The data 342 optionally includes auto-negotiation data. When the data 342 is routed to the SGMII module 202, the PHY 106 is said to operate in the SGMII mode. When the data 342 is routed the SerDes pass-through module 204, the PHY 106 is said to operate in the SerDes pass-through mode. The functional illustration of FIG. 3 is provided for exemplary purposes. The invention is not, however, limited to the functional illustration of FIG. 3.

The mode selector logic 338 includes logic and/or embedded software that processes the filtered fiber SD signal 320 and the filtered copper link detect signal 316 to select a mode of operation. Table 1 below is an example truth table illustrating logic and/or embedded software implemented by mode selector 330.

TABLE 1

| Fiber SD Signal 308/320 | Copper Link Detect Signal 310/316 | Mode Selected by the Mode Selector 330 |
|---|---|---|
| 0 | 0 | Configurable |
| 0 | 1 | SGMII Mode |
| 1 | 0 | SerDes Pass-Through Mode |
| 1 | 1 | Configurable |

When the filtered copper link detect signal 316 is active and the filtered fiber SD signal 320 is inactive, SGMII mode is selected. Similarly, when the filtered copper link detect signal 316 is inactive and the filtered fiber SD signal 320 is active, SerDes pass-through mode is selected. When SGMII mode is selected, the PHY 106 interfaces between the MAC/switch and the copper link 116a through the SGMII module 202. When SerDes pass-through mode is selected, the PHY 106 interfaces between the MAC/switch 102 and the fiber link 116b through the SerDes Pass-Through module 204.

The mode selector 330 provides optionally configurable states as well. A first optionally configurable state applies when no active link is detected on either the copper link 116a or the fiber link 116b. A second optionally configurable state applies when active links are detected on both the copper link 116a and the fiber link 116b. The mode selector 330 is optionally configurable for either or both of these situations. In other words, the mode selector 330 can be configured to default to SGMII or SerDes pass-through mode in one or both of the situations. Alternatively, the mode selector 330 can be configured to default to SGMII mode for one of the two situations, and to SerDes pass-through mode for the other situation. This configurability essentially allows prioritization of SGMII or SerDes pass-through mode. The priorities can be configurable through logic settings and/or software.

VI. POWERING DOWN UNSELECTED MEDIA

The detection of one or more active link partners can be used to power down, in whole or in part, circuitry associated with an unselected mode of operation, as now described. In the example of FIG. 3, the optional power-down feature is implemented with an optional power-down module 346. When the SerDes pass-through mode is selected, the power-down module 346 powers down the SGMII module 202, or portions thereof. When SGMII mode is selected, the power-down module 346 powers down the SerDes Pass-Through module 204, or portions thereof.

In the example of FIG. 3, the power-down module 346 is controlled by the mode selector 330. Alternatively, the power-down module 346 receives the copper link detect signal 310, the fiber SD signal 308, the filtered copper link detect signal 316, and/or the filtered fiber SD signal 320, directly, and determines whether to power-down the SGMII module 202 or the SerDes Pass-Through module 204, in whole or in part.

The default priorities discussed above can be employed by the power down module 346. For example, when priority is set to SerDes pass-through mode, and when both the copper link 116a and the fiber link 116b are active, the SGMII module 202 is powered down, in whole or in part. This would prevent a copper link partner attached to the copper link 116a from attempting to link up since no energy is transmitted into the copper link 116a by the SGMII module 202 when it is powered down.

The default priorities discussed above can be further used to prevent the prioritized mode circuitry from being completely powered down. In other words, if the prioritized media is currently inactive, then the circuitry associated with the prioritized media would not be powered down. This allows the PHY 106 to detect a subsequently active link partner and switch to the prioritized mode.

For example, when priority is set to fiber mode, and only the copper link 116a is active, SGMII mode is selected, but the SerDes Pass-Through module 204 is not powered down, or at least not completely powered down. This allows the PHY 106 to detect a subsequently active fiber link partner and switch to fiber mode. In this case, the SGMII module 202 can then be powered down in whole or in part.

The optional power-down module 346 can be implemented as disclosed in one or more of the following co-pending U.S. applications:

Ser. No. 09/928,622, titled, "Energy Detect with Auto Pair Select," filed Aug. 13, 2001;

Ser. No. 09/886,859, titled, "Regulating Transceiver Power Consumption for a Transceiver in a Communications Network," filed Jun. 21, 2001; and/or Ser. No. 10/231,066, titled, "Auto Powerdown for Forced Speed Modes," filed Aug. 30, 2002.

All of which are incorporated herein by reference in their entireties. The invention is not, however, limited to the embodiments disclosed therein.

VII. METHODS FOR DETECTING ACTIVE LINK PARTNERS, FOR SELECTING A MODE OF OPERATION, AND FOR POWERING DOWN UNSELECTED MEDIA

Figure 4:
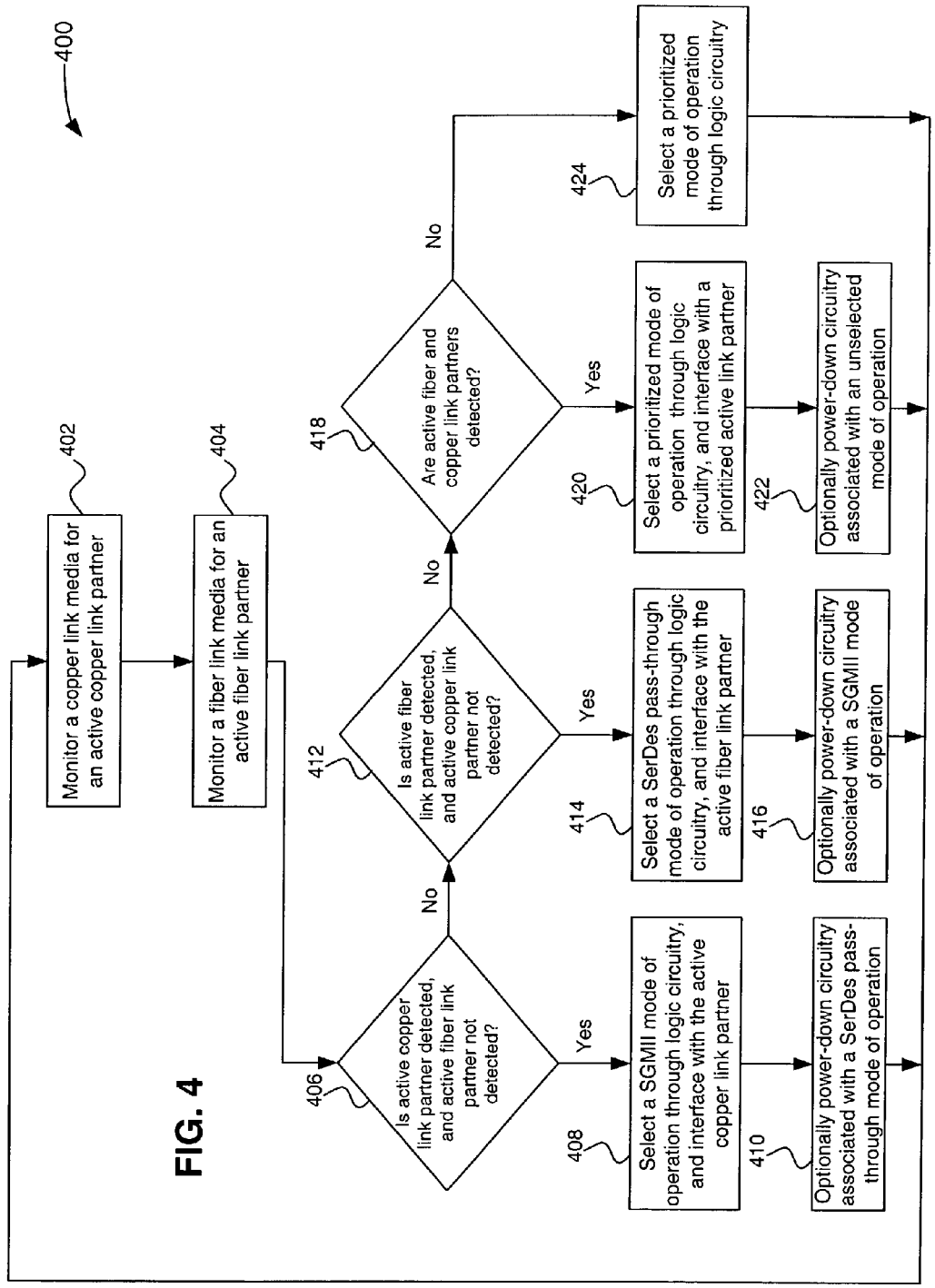
FIG. 4 is a process flowchart 400 for detecting active link partners, for selecting an appropriate mode of operation, and for powering down unselected media, in accordance with the invention.

FIG. 4 is a process flowchart 400 for operating a physical layer device ("PHY") in an Ethernet network. More particularly, the process flowchart 400 illustrates a method for detecting active link partners, for selecting an appropriate mode of operation, and for powering down unselected media, in accordance with the invention. The process flowchart 400 is described with reference to one or more of the example block diagrams in FIGS. 1-3. The process flowchart 400 is not, however, limited to the example block diagrams in FIGS. 1-3. Based on the description herein, one skilled in the relevant art(s) will understand that the process flowchart 400 can be implemented with other Ethernet module implementations as well.

The process begins at step 402, which includes monitoring a copper link media for an active copper link partner.

Step 404 includes monitoring a fiber link media for an active fiber link partner.

In step 406, if an active copper link partner is detected and an active fiber link partner is not detected, processing proceeds to step 408. In step 408, a serial gigabit media independent ("SGMII") mode of operation is selected for the PHY, and the PHY interfaces with the active copper link partner in the SGMII mode of operation, substantially as described above.

Processing optionally proceeds to step 410, which includes powering down circuitry associated with a serialize/deserialize ("SerDes") pass-through mode of operation. The powering down operation can be a partial or complete powering down operation. Processing then returns to step 402, which can be repeated when the PHY detects a link partner change.

Referring back to step 406, and following the path to step 412, if an active fiber link partner is detected and an active copper link partner is not detected, processing proceeds to step 414. In step 414, a SerDes pass-through mode of operation is selected for the PHY, and the PHY interfaces with the active fiber link partner in the SerDes pass-through mode of operation, substantially as described above.

Processing optionally proceeds to step 416, which includes powering down circuitry associated with the SGMII mode of operation. The powering down operation can be a partial or complete powering down operation. Processing then returns to step 402, as described above.

Referring back to step 412, and following the path to step 418, if active fiber and copper link partners are detected, processing proceeds to step 420. In step 420, a prioritized mode of operation is selected for the PHY, and the PHY interfaces with the associated active link partner in the prioritized mode of operation. For example, when the SGMII mode of operation is prioritized, the SGMII mode of operation is selected, and the PHY interfaces with the active copper link partner in the SGMII mode of operation. Alternatively, when the SerDes pass-through mode of operation is prioritized, the SerDes pass-through mode of operation is selected, and the PHY interfaces with the active fiber link partner in the SerDes pass-through mode of operation. Preferably, a mode of operation can be prioritized by a user through hardware, software, firmware, and/or combinations thereof. Alternatively, priority is factory-set.

Processing optionally proceeds to step 420, which includes powering down circuitry associated with an unselected mode of operation. The powering down operation can be a partial or complete powering down operation. Processing then returns to step 402, as described above.

Referring back to step 418, if no active fiber or copper link partners are detected, processing proceeds to step 424. In step 422, a prioritized mode of operation is selected for the PHY. Processing then returns to step 402, as described above.

VIII. INTEGRATION IN A MULTI-MODE PHY

Figure 5:
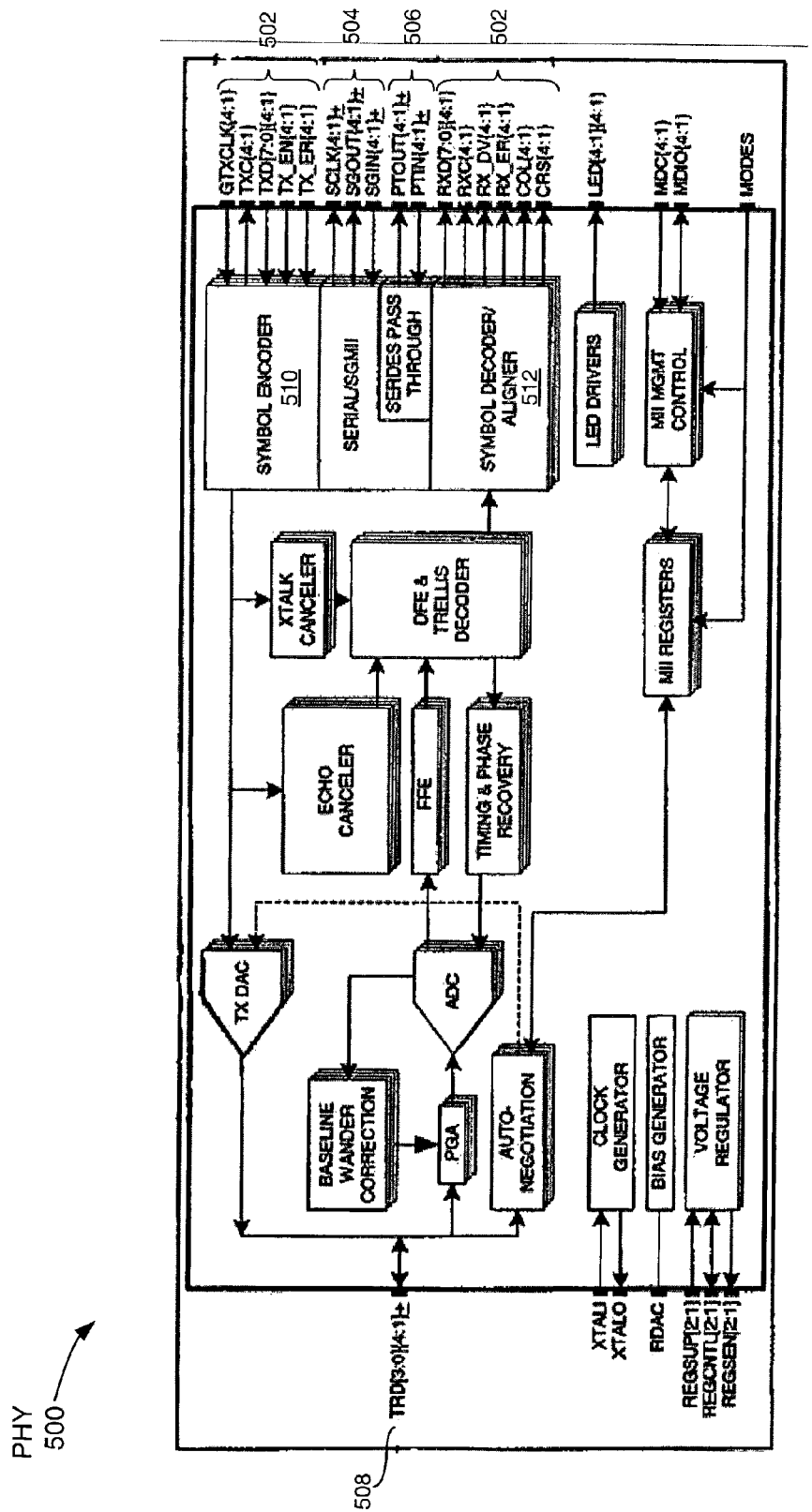
FIG. 5 is a block diagram of a multi-mode physical layer device 700 in which the present invention can be implemented.

The present invention can be implemented within a multi-mode PHY integrated circuit ("IC") that is designed to interface with MACs, switches, and/or optical devices through one or more of SGMII, SerDes, and or other interface formats. For example, FIG. 5 is a block diagram of a multi-mode PHY IC 500 in which the present invention can be implemented.

The PHY IC 500 includes serial/SGMII ports 504 that can used as input ports or output ports. As input ports, the serial/SGMII ports 504 can be coupled to an SGMII MAC/switch 102, a 1000-X MAC/switch 102, or any other type of serial MAC/switch. As output ports, the serial/SGMII ports 504 can be coupled to a fiber physical link media.

The PHY 500 further includes SerDes pass-through ports 506, which can be used in a SerDes pass-through mode (1000-X), described above, wherein a SerDes signal is received from a SerDes MAC/switch 102, or optical device, via serial/SGMII ports 504, for example, and passed through SerDes pass-through ports 506 to another SerDes device.

The SerDes interface can be used in at least three applications. First, the SerDes interface can be connected to a SerDes fiber module in a fiber-to-copper media-converter application. Second, the SerDes interface can be connected to a SerDes MAC or switch for SerDes MAC-to-copper application. Third, the SerDes interface can be put into the pass-through mode, described herein, where serial data (1000-X) is communicated between the MAC SerDes and another SerDes interface. The SerDes interface transmits serial data differentially at 1.25 GBaud via the SGOUT± pin, and receives differentially via the SGIN± pin. The SerDes interface pins are shared with the SGMII interface pins 504.

The SerDes interface can be implemented to handle a 1.25 Gbaud data signal with a 625 MHz clock (DDR interface). Each signal is generated as a differential pair to provide signal integrity and minimize noise. All three speeds, 10, 100, and 1000, of the GMII can be supported in the new interface for backward compatibility.

The PHY IC 500 also includes a copper port 508, which couples to a copper link. The PHY IC 500 also includes copper mode circuitry for processing data sent and/or received through the copper port 508, including echo cancellation circuitry, cross-talk cancellation circuitry, equalization circuitry, timing and phase recovery circuitry, gain control circuitry, and baseline wander correction circuitry.

The PHY 500 IC also includes parallel data ports 502 that can be coupled to a MII/GMII MAC/switch.

IX. CONCLUSION

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software, and the like, and/or combinations thereof.

When used herein, the terms "connected" and/or "coupled" are generally used to refer to electrical connections. Such electrical connections can be direct electrical connections with no intervening components, and/or indirect electrical connections through one or more components.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for detecting active link partners and for selecting a mode of operation based on detected active link partners, in an Ethernet physical layer device ("PHY"), comprising:
   (1) monitoring an energy level of a port of a copper link media for an active copper link partner;
   (2) monitoring a fiber link media for an active fiber link partner;
   (3) selecting a serial gigabit media independent interface ("SGMII") mode of operation when said active copper link partner is detected and said active fiber link partner is not detected;
   (4) selecting a serializer/deserializer ("SerDes") pass-through mode of operation when said active fiber link partner is detected and said active copper link partner is not detected;
   (5) interfacing with said active copper link partner when said copper mode of operation is selected; and
   (6) interfacing with said active fiber link partner when said SerDes pass-through mode of operation is selected.

2. The method according to claim 1, further comprising:
   (7) powering down circuitry associated with an unselected mode of operation.

3. The method according to claim 1, further comprising:
   (7) selecting said SerDes pass-through mode of operation when said active fiber link partner and said active copper link partner are detected.

4. The method according to claim 3, further comprising:
   (8) powering down circuitry associated with said SGMII mode of operation.

5. The method according to claim 1, further comprising:
   (7) selecting said SGMII mode of operation when said active copper link partner and said active fiber link partner are detected.

6. The method according to claim 5, further comprising:
   (8) powering down circuitry associated with said SerDes mode of operation.

7. The method according to claim 1, wherein step (3) comprises:
   (3)(a) utilizing a user-controllable priority setting to select said SGMII mode of operation when said active copper link partner and said active fiber link partner are detected.

8. The method according to claim 7, further comprising:
   (7) powering down circuitry associated with said SerDes mode of operation.

9. The method according to claim 7, wherein step (3)(a) comprises:
   (3)(a)(i) utilizing a logic circuit to select said SGMII mode of operation when said active copper link partner and said active fiber link partner are detected.

10. The method according to claim 7, wherein step (3)(a) comprises:
    (3)(a)(i) utilizing a register to select said SGMII mode of operation when said active copper link partner and said active fiber link partner are detected.

11. The method according to claim 7, wherein step (3)(a) comprises:
    (3)(a)(i) utilizing software to select said SGMII mode of operation when said active copper link partner and said active fiber link partner are detected.

12. The method according to claim 1, further comprising:
    (7) interfacing with a media access controller through a serial interface.

13. The method according to claim 1, further comprising:
(7) interfacing with a media access controller through a gigabit media independent interface.

14. The method according to claim 1, wherein step (1) comprises:
(1)(a) receiving a signal from copper link detect circuitry.

15. The method according to claim 14, wherein step (1) further comprises:
(1)(b) filtering said signal from said copper link detect circuitry.

16. The method according to claim 15, wherein step (1) further comprises:
(1)(c) debouncing said signal from said copper link detect circuitry.

17. The method according to claim 1, wherein step (2) comprises:
(2)(a) receiving a fiber signal detect signal from an optical/electrical converter.

18. The method according to claim 17, wherein step (2) further comprises:
(2)(b) filtering said fiber signal detect signal.

19. The method according to claim 18, wherein step (2) further comprises:
(2)(c) debouncing said fiber signal detect signal.

20. The method according to claim 1, wherein step (4) comprises:
(4)(a) utilizing a user-controllable priority setting to select said SerDes mode of operation when said active copper link partner and said active fiber link partner are detected.

21. The method according to claim 20, further comprising:
(7) powering down circuitry associated with said SGMII mode of operation.

22. The method according to claim 20, wherein said user-controllable priority setting is implemented with a logic circuit.

23. The method according to claim 20, wherein said user-controllable priority setting is implemented with a register.

24. The method according to claim 20, wherein said user-controllable priority setting is implemented with software.

25. The method according to claim 1, wherein step (6) comprises:
(6)(a) interfacing with said active fiber link partner by deserializing said data received from said active fiber link partner and re-serializing said deserialized data for transmission to a media access controller (MAC) when said SerDes pass-through mode of operation is selected.

26. The method according to claim 25, wherein step (6) further comprises:
(6)(b) interfacing with said active fiber link partner by deserializing data received from said MAC and re-serializing said deserialized data for transmission over said active fiber link partner when said SerDes pass-through mode of operation is selected.

27. A method for detecting active link partners and for selecting a mode of operation based on detected active link partners, in an Ethernet physical layer device ("PHY"), comprising:
(1) monitoring an energy level of a copper link media for an active copper link partner;
(2) monitoring a fiber link media for an active fiber link partner;
(3) selecting a serial gigabit media independent interface ("SGMII") mode of operation when said active copper link partner is detected and said active fiber link partner is not detected;
(4) selecting a serializer/deserializer ("SerDes") pass-through mode of operation when said active fiber link partner is detected and said active copper link partner is not detected, wherein the SerDes pass-through mode of operation includes deserializing received data and re-serializing the deserialized data for transmission, wherein the SerDes pass-through mode of operation does not include decoding the deserialized data;
(5) interfacing with said active copper link partner when said copper mode of operation is selected; and
(6) interfacing with said active fiber link partner when said SerDes pass-through mode of operation is selected.

28. A physical layer device for an Ethernet communication system configured to detect active link partners and to switch between modes of operation based on detected active link partners, without user intervention, comprising:
a mode selector including mode select logic;
a serial packet-based interface port coupled to said mode selector;
a fiber link media port coupled to said mode selector;
a fiber signal detect port coupled to said mode selector;
a copper link media port coupled to said mode selector;
copper link detect circuitry coupled to said copper link media port and coupled to said mode selector, said copper link detect circuitry configured to detect an active copper link partner coupled to said copper link media port, wherein said copper link detect circuitry is configured to monitor an energy level at said copper link media port;
a serializer/deserializer ("SerDes") pass-through mode module coupled between said mode selector and said fiber link media port, said SerDes pass-through mode module configured to interface with said active fiber link partner; and
a serial gigabit media independent interface ("SGMII") mode module coupled between said mode selector and said copper link media port, said SGMII mode module configured to interface with said active copper link partner,
wherein said mode selector monitors said fiber signal detect port for an active fiber link partner,
wherein said mode selector monitors an output of said copper link detect circuitry for an active copper link partner,
wherein said mode select logic controls said mode selector to couple said serial packet-based interface port with said SerDes pass-through mode module when said active fiber link partner is detected and said active copper link partner is not detected, and
wherein said mode select logic controls said mode selector to couple said serial packet-based interface port with said SGMII mode module when said active copper link partner is detected and said active fiber link partner is not detected.

29. The apparatus according to claim 28, further comprising:
an auto-negotiation module configured to communicate a selected mode of operation to a media access controller that is coupled to said physical layer device.

30. The apparatus according to claim 28, wherein said mode select logic comprises:
a user-controllable priority setting that controls said mode selector to couple said serial packet-based interface port to said SerDes pass-through mode module or said SGMII mode module when said active copper link partner and said active fiber link partner are detected.

31. The apparatus according to claim 30, further comprising:
a power down module coupled to said mode selector, said SerDes pass-through mode module, and said SGMII mode module,
wherein said power down module is configured to power down circuitry associated with said SerDes pass-through mode module when said serial packet-based interface port is coupled to said SGMII mode module, and
wherein said power down module is configured to power down circuitry associated with said SGMII mode module when said serial packet-based interface port is coupled to said SerDes pass-through mode module.

32. The apparatus according to claim 28, wherein said mode select logic controls said mode selector to couple said serial packet-based interface port with said SerDes pass-through mode module when said active copper link partner and said active fiber link partner are detected.

33. The apparatus according to claim 32, further comprising:
a power down module coupled to said mode selector and said SGMII mode module, wherein said power down module is configured to power down circuitry associated with said SGMII mode module when said serial packet-based interface port is coupled to said SerDes pass-through mode module.

34. The apparatus according to claim 28, wherein said mode select logic controls said mode selector to couple said serial packet-based interface port with said SGMII mode module when said active copper link partner and said active fiber link partner are detected.

35. The apparatus according to claim 34, further comprising:
a power down module coupled to said mode selector and said SerDes pass-through mode module, wherein said power down module is configured to power down circuitry associated with said SerDes pass-through mode module when said serial packet-based interface port is coupled to said SGMH mode module.

36. The apparatus according to claim 28, further comprising:
a power down module coupled to said mode selector, said SerDes pass-through mode module, and said SGMII mode module.

37. The apparatus according to claim 36, wherein:
said power down module is configured to power down circuitry associated with said SerDes pass-through mode module when said serial packet-based interface port is coupled to said SGMII mode module; and
said power down module is configured to power down circuitry associated with said SGMII mode module when said serial packet-based interface port is coupled to said SerDes pass-through mode module.

38. The apparatus according to claim 28, further comprising:
a copper link detect signal filter coupled between said copper link detect circuitry and said mode selector.

39. The apparatus according to claim 38, wherein said copper link detect signal filter is configured to filter the output signal from said copper link detect circuitry.

40. The apparatus according to claim 38, wherein said copper link detect signal filter is configured to debounce the output signal from said copper link detect circuitry.

41. The apparatus according to claim 28, further comprising:
a fiber signal detect signal filter coupled between said fiber signal detect port and said mode selector.

42. The apparatus according to claim 41, wherein said fiber signal detect signal filter is configured to filter a fiber signal detect signal received from said fiber signal detect port.

43. The apparatus according to claim 42, wherein said fiber signal detect signal filter is configured to debounce a fiber signal detect signal received from said fiber signal detect port.

44. The apparatus according to claim 28, wherein said SerDes pass-through mode module is further configured to deserialize data received from said active fiber link partner and re-serialize said deserialized data for transmission to a media access controller (MAC).

45. The apparatus according to claim 44, wherein said SerDes pass-through mode module is further configured to deserialize data received from said MAC and re-serialize said deserialized data for transmission over said active fiber link partner.

46. A physical layer device for an Ethernet communication system configured to detect active link partners and to switch between modes of operation based on detected active link partners, without user intervention, comprising:
a mode selector including mode select logic;
a serial packet-based interface port coupled to said mode selector;
a fiber link media port coupled to said mode selector;
a fiber signal detect port coupled to said mode selector;
a copper link media port coupled to said mode selector;
copper link detect circuitry coupled to said copper link media port and coupled to said mode selector, said copper link detect circuitry configured to monitor an energy level of said copper link media port to detect an active copper link partner coupled to said copper link media port;
a serializer/deserializer ("SerDes") pass-through mode module coupled between said mode selector and said fiber link media port, said SerDes pass-through mode module configured to interface with said active fiber link partner, wherein the SerDes pass-through mode module is configured to deserialize received data and re-serialize the deserialized data for transmission, wherein the SerDes pass-through mode of operation does not decode the deserialized data; and
a serial gigabit media independent interface ("SGMH") mode module coupled between said mode selector and said copper link media port, said SGMII mode module configured to interface with said active copper link partner;
wherein said mode selector monitors said fiber signal detect port for an active fiber link partner;
wherein said mode selector monitors an output of said copper link detect circuitry for an active copper link partner;
wherein said mode select logic controls said mode selector to couple said serial packet-based interface port with said SerDes pass-through mode module when said active fiber link partner is detected and said active copper link partner is not detected;
wherein said mode select logic controls said mode selector to couple said serial packet-based interface port with said SGMII mode module when said active copper link partner is detected and said active fiber link partner is not detected.

47. A physical layer device for an Ethernet communication system, configured to detect active link partners and to select a mode of operation based on detected active link partners without user intervention, comprising:

means for monitoring an energy level at a port of a copper link media for an active copper link partner;

means for monitoring a fiber link media for an active fiber link partner;

means for selecting, through logic circuitry, a serial gigabit independent interface ("SGMII") mode of operation when said active copper link partner is detected and said active fiber link partner is not detected;

means for selecting, through said logic circuitry, a serialize/deserialize ("SerDes") pass-through mode of operation when said active fiber link partner is detected and said active copper link partner is not detected;

means for interfacing with said active copper link partner when said SGMII mode of operation is selected; and means for interfacing with said active fiber link partner when said SerDes pass-through mode of operation is selected.

48. The apparatus according to claim 47, wherein said means for selecting utilizes a user-controllable priority setting to select said SGMII mode of operation or said SerDes mode of operation when no active copper link partner and no active fiber link partner are detected.

49. The apparatus according to claim 47, wherein said means for deserializing data received from said active fiber link partner and re-serializing said deserialized data for transmission comprises:

means for deserializing data received from said active fiber link partner and re-serializing said deserialized data for transmission to a media access controller (MAC).

50. The apparatus according to claim 49, wherein said means for deserializing data received from said active fiber link partner and re-serializing said deserialized data for transmission further comprises:

means for deserializing data received from said MAC and re-serializing said deserialized data for transmission over said active fiber link partner.

* * * * *

UNITED STATES PATENT AND TRADEMARK OFFICE
CERTIFICATE OF CORRECTION

| | | |
|---|---|---|
| PATENT NO. | : 7,787,387 B2 | Page 1 of 1 |
| APPLICATION NO. | : 10/230158 | |
| DATED | : August 31, 2010 | |
| INVENTOR(S) | : Gary S. Huff | |

It is certified that error appears in the above-identified patent and that said Letters Patent is hereby corrected as shown below:

At column 15, line 41, please replace "said SGMH mode module" with --said SGMII mode module--.

At column 16, lines 46-47, please replace "a serial gigabit media independent interface ("SGMH") mode module" with --a serial gigabit media independent interface ("SGMII") mode module--.

Signed and Sealed this
Twenty-fourth Day of May, 2011

David J. Kappos
*Director of the United States Patent and Trademark Office*